United States Patent
Yang et al.

(10) Patent No.: US 9,099,762 B2
(45) Date of Patent: Aug. 4, 2015

(54) COMPOSITE PHASE CHANGE MATERIAL

(71) Applicant: Chervon (HK) Limited, Wanchai (HK)

(72) Inventors: Dezhong Yang, Nanjing (CN); Hao Du, Nanjing (CN); Jianjun Shuang, Yuhua District (CN)

(73) Assignee: Chervon (HK) Limited, Hong Kong (HK)

( * ) Notice: Subject to any disclaimer, the term of this patent is extended or adjusted under 35 U.S.C. 154(b) by 0 days.

(21) Appl. No.: 13/860,922

(22) Filed: Apr. 11, 2013

(65) Prior Publication Data

US 2013/0270476 A1  Oct. 17, 2013

(30) Foreign Application Priority Data

Apr. 13, 2012 (CN) .......................... 2012 1 0107991

(51) Int. Cl.
*H01M 10/655* (2014.01)
*C09K 5/06* (2006.01)
*H01M 10/659* (2014.01)
*H01M 10/052* (2010.01)

(52) U.S. Cl.
CPC ........... *H01M 10/5044* (2013.01); *C09K 5/063* (2013.01); *H01M 10/5089* (2013.01); *H01M 10/052* (2013.01)

(58) Field of Classification Search
None
See application file for complete search history.

(56) References Cited

U.S. PATENT DOCUMENTS

2003/0151030 A1 *  8/2003  Gurin ............................ 252/502
2004/0069454 A1 *  4/2004  Bonsignore et al. ....... 165/104.15
2012/0225290 A1 *  9/2012  Hartmann et al. ............ 428/364

* cited by examiner

*Primary Examiner* — Necholus Ogden, Jr.
(74) *Attorney, Agent, or Firm* — Greenberg Traurig, LLP

(57) ABSTRACT

A composite phase change material and the method for forming the material is disclosed herein. Thereof, especially a composite phase change material for lithium battery cooling, comprising polyethylene glycol, silica vehicle and composite flame retardant comprising graphite and polymer, wherein the weight ratio of the graphite and polymer is approximately 1:2. The composite phase change material according to the invention has a good stability and a thermal conductivity, a small corrosivity, a high phase transition enthalpy of 150-350 J/g, and a morphological stability during phase change. Moreover, addition of high thermal conductivity material and composite flame retardant ensures good thermal conductivity and excellent flame retardant effect of the phase change material.

22 Claims, 2 Drawing Sheets

| No. | Formulation | | | Property-HB level | Fluidity |
|---|---|---|---|---|---|
| | PEG | SiO$_2$ | Flame retardant | Alcohol lamp | |
| 1 | 77.1% | 8.5% | 14.3% | NO | Poor |
| 2 | 67.5% | 7.5% | 25.0% | OK | Poor |
| 3 | 72.0% | 8.0% | 20.0% | OK | Poor |
| 4 | 74.5% | 8.3% | 17.2% | NO | Poor |
| 5 | 76.0% | 4.0% | 20.0% | NO | Good |
| 6 | 74.0% | 6.0% | 20.0% | OK | Common |
| 7 | 73.2% | 6.8% | 20.0% | OK | Less poor |

| No. | Formulation | | | Property-HB level | Fluidity |
|---|---|---|---|---|---|
| | PEG | SiO$_2$ | Flame retardant | Alcohol lamp | |
| 1 | 77.1% | 8.5% | 14.3% | NO | Poor |
| 2 | 67.5% | 7.5% | 25.0% | OK | Poor |
| 3 | 72.0% | 8.0% | 20.0% | OK | Poor |
| 4 | 74.5% | 8.3% | 17.2% | NO | Poor |
| 5 | 76.0% | 4.0% | 20.0% | NO | Good |
| 6 | 74.0% | 6.0% | 20.0% | OK | Common |
| 7 | 73.2% | 6.8% | 20.0% | OK | Less poor |

FIG.1

| Polyethylene glycol + silica 80% | | | Composite flame retardant 20% | | | HB level flame retardancy | V-2 level flame retardancy |
|---|---|---|---|---|---|---|---|
| Polyethylene glycol | Silica | Ratio | Polymer | Graphite | Ratio | | |
| 72% | 8% | 9:1 | 5% | 15% | 1:3 | YES | NO |
| 72% | 8% | 9:1 | 10% | 10% | 1:1 | YES | NO |
| Polyethylene glycol + silica 85.7% | | | Composite flame retardant 14.3% | | | HB level flame retardancy | V-2 level flame retardancy |
| Polyethylene glycol | Silica | Ratio | Polymer | Graphite | Ratio | | |
| 77.1% | 8.6% | 9:1 | 7.15% | 7.15% | 1:1 | OK | NO |
| 77.1% | 8.6% | 9:1 | 9.53% | 4.77% | 2:1 | OK | OK |
| 77.1% | 8.6% | 9:1 | 5.72% | 8.58% | 2:3 | NO | NO |

FIG. 2

COMPOSITE PHASE CHANGE MATERIAL

CROSS REFERENCE TO RELATED APPLICATION

This application is a non-provisional application claiming priority from Chinese Patent Application No. 201210107991.4, filed Apr. 13, 2012, and incorporated herein by reference in its entirety.

FIELD OF THE DISCLOSURE

The present disclosure generally relates to a composite phase change material, and more particularly to a material well suited for battery cooling.

BACKGROUND OF RELATED ART

Heat storage technology can be used to improve utility efficiency of energy and environment protection. A phase change material is a substance with a high heat of fusion which, melting and solidifying at a certain temperature, is capable of storing and releasing large amounts of energy. For instance, heat may be absorbed or released when the material changes from solid to liquid and vice versa. As such, phase change materials are oftentimes classified as latent heat storage units. A phase change material is one example of a latent heat material that has been researched in the field of the heat storage technology, because the phase change material has a large thermal storage density, and the process is easy to control. Thermal storage and exothermic processes are approximately isothermal and the temperature range to be controlled is large.

An organic composite phase change material can not only overcome shortcomings presented in the single inorganic and/or organic phase change material, but can also improve the thermal conductivity efficiency and the possible applications of the phase change material. Thus it is an ideal phase change material. The composite phase change material, having less corrosiveness, non-toxicity, and a high stability, has been widely applied in the thermostatical control field, such as solar energy, waste heat recovery, building heating, and air conditioning, no name a few, and now is an important heat storage material.

SUMMARY

One object of the preset disclosure is to provide a new composite phase change material, which may be well suited for cell cooling, and a preparation method thereof For instance, in one example, the present disclosure provides a composite phase change material, comprising polyethylene glycol, silica vehicle, and a composite flame retardant with graphite and polymer, the weight ratio of the graphite and the polymer in the composite flame retardant is approximately 1:2.

In one example, the silica vehicle is nanoscale silica particles.

In one example, the polymer is at least one of polypropylene or ammonium polyphosphate.

In one example, the silica vehicle presents from 2 to 10% of the composite phase change material.

In one example, the composite flame retardant presents approximately 20% of the composite phase change material.

In one example, the weight ratio of the polyethylene and the silica is approximately 9:1.

In one example, the graphite is an expanded graphite.

In one example, the composite phase change material is operable for cooling a lithium-ion battery provided with at least one single lithium-ion battery cell with a diameter close to 18 mm and a length close to 65 mm.

In one example, the lithium-ion battery is removably connectable to a power tool.

The present disclosure also provides a method of preparing the disclosed composite phase change material. In one example method polyethylene glycol is dissolved in water and a suitable amount of a silica gel solution formed by reacting a silica vehicle and a hydrogel is added. The polyethylene glycol and the silica gel solution is mixed sufficiently by stirring, and water is evaporated, to obtain a mixture of the polyethylene glycol and the silica vehicle. The resulting mixture is crushed and a composite flame retardant comprising graphite and a polymer in a weight ratio of approximately 1:2 is added and stirred uniformly to obtain the composite phase change material.

In one example, the polymer is at least one of polypropylene or ammonium polyphosphate.

In one example, the silica vehicle is nanoscale silica particles.

In one example, the silica particles have a diameter from 8 to 15 nm.

In one example, when mixing the polyethylene glycol and the silica gel solution, a promoter composed of at least one of calcium chloride, magnesium chloride, or aluminum chloride is added.

In one example, the silica vehicle presents from 2 to 10% of the composite phase change material.

In one example, the composite flame retardant presents from 5 to 25% of the composite phase change material.

In one example, the weight ratio of the polyethylene glycol and the silica in the composite phase change material is approximately 9:1.

In one example, the composite phase change material may be used for cooling a battery such as a lithium-ion battery provided with at least one single lithium-ion battery cell with a diameter approximately 18 mm and a length approximately 65 mm.

In one example, the lithium-ion battery is removably connectable to a power tool.

The example composite phase change material described herein generally include characteristics such as for example good stability and thermal conductivity, a low tendency towards corrosion, a high phase transition enthalpy of approximately 150-350 J/g, and a morphological stability during phase change. Moreover, the addition of a high thermal conductivity material and/or a composite flame retardant to the composite phase change material can help to ensure good thermal conductivity and excellent flame retardancy effect of the phase change material, which can eliminate heat of rechargeable battery, in particular lithium chemical matrix battery, achieve the desired effect, increase efficiency and increase the service life of the battery.

BRIEF DESCRIPTION OF THE DRAWINGS

FIG. 1 illustrates an example test of fluidity and flame retardancy of the disclosed phase change material composed of polyethylene glycol, silica and composite flame retardant in different ratios.

FIG. 2 illustrates an example test of fluidity and flame retardancy of the disclosed phase change material composed of polyethylene glycol, silica, and composite flame retardant in different ratios.

DETAILED DESCRIPTION

The following description of example methods and apparatus is not intended to limit the scope of the description to the precise form or forms detailed herein. Instead the following description is intended to be illustrative so that others may follow its teachings.

Generally, the present disclosure is intended to provide a composite phase change material, especially for eliminating heat from a battery such as a lithium-ion battery removably connectable to a power tool with at least one single lithium-ion battery cell, such as a battery with a diameter approximately 18 mm and a length approximately 65 mm, comprising polyethylene glycol (PEG), silica ($SiO_2$) vehicle, and a composite flame retardant containing graphite and polymer, the silica vehicle is nanoscale material, wherein the ratio of the graphite and the polymer in the composite flame retardant is approximately 1:2. The polymer can be polypropylene, ammonium polyphosphate and/or a combination thereof. The method of preparing the composite phase change material will be illustrated in detail below.

EXAMPLE 1

In one example, (1) 180 g of polyethylene glycol with Mn of 8000 is dissolved in 350 g of water to form a solution of polyethylene glycol. Additionally, 20 g of a silica vehicle is reacted with a hydrogel to form a silica gel solution, and then the resultant solution is combined with the above solution of polyethylene glycol.

(2) The solution of polyethylene glycol is sufficiently mixed with the silica gel solution.

(3) After mixing, the water in the mixed solution is evaporated by heating, drying, and/or drying naturally to obtain a mixture of the polyethylene glycol and the silica.

(4) The mixture is crushed by, for example, a crushing machine and/or other crushing methods, and then 33 g composite flame retardant of graphite and ammonium polyphosphate is added to obtain the composite phase change material after being stirred uniformly, wherein the weight ratio of the graphite and the ammonium polyphosphate is 1:2.

In one example, the composite phase change material obtained by the above process generally has a stable morphology, good flame retardancy, and a phase transition enthalpy of approximately 150-350 J/g.

In the above composite phase change material and the method thereof, the silica gel solution is obtained by reacting nanoscale silica, especially silica particles having a diameter of approximately 8-15 nm with hydrogel.

In one example, the above composite flame retardant can be a mixture of graphite and polypropylene, and/or a mixture of graphite, polypropylene, and ammonium polyphosphate.

In other example, a composite phase change material having different phase transition enthalpy can be obtained by varying the ratio of polyethylene glycol, silica gel solution and composite flame retardant, thereby varying the properties of flame retardancy, resistance and anti-sagging. For instance, as shown in FIG. 1, the different contents of silica affected the viscosity (fluidity) of the phase change material. When the content of silica is 2-10%, especially closing to 8%, the viscosity is moderate. After the composite phase change material is packaged in a lithium battery and charged for 180 times, the phase change material did not overflow the packaging and remained a good morphology. In particular, when the weight ratio of the polyethylene glycol and the silica is 9:1, the fluidity of the phase change material is poor, and when it is packaged in the lithium battery and phase change is occurred, it did not exhibit leakage.

While in the present disclosure the graphite is an expanded graphite, it will be appreciated by one of ordinary skill in the art that it can also be an expandable graphite material.

FIG. 2 illustrates a sample test record of the flame retardancy of the phase change materials with different ratios of polyethylene glycol, silica, and composite flame retardant. In particularly, when the composite flame retardant presents 5-25% therein, especially closing to 20%, the flame retardancy of the resulting composite phase change material is better and it can be subjected to HB order of the flame retardancy test above alcohol lamp. In one example, the weight ratio of the graphite and the polymer is 1:2, and the resulting composite phase change material can be subjected to V-2 order of the flame retardancy test.

It has also been found in the test, that when the polyethylene glycol presents 50-90% of the composite phase change material, especially 75-80%, the resulting composite phase change material has the best properties, and during phase change it has a stable morphology, a higher resistance, and a good flame retardancy, which is suitable for cooling of a battery unit such as a lithium-ion battery unit.

It has also been found in the test, that when the nanoscale silica particles are dissolved in water, the addition of a calcium chloride promoter can accelerate the gel reaction speed of silica gel. In addition, calcium chloride, magnesium chloride, aluminum chloride, and/or any combination thereof can be also added to accelerate the gel reaction speed. When the content of the promoter presents 1-10% of the whole composite phase change material, especially 1-5%, the effect is more significant.

In one example, in order to increase the thermal conductivity of the composite phase change material, a high thermal conductivity material comprising at least one of carbon fibers, metal foam, nano-aluminum nitride, nanoscale metal particles, nanoscale metal oxide particles or metal shavings can be added during the preparation process.

EXAMPLE 2

In another example, (1) 100 g water is added to 25 g sodium silicate ($Na_2SiO_3 \cdot nH_2O$), and the sodium silicate is completely dissolved.

(2) The pH value of the sodium silicate solution is measured, and then suitable amount of sulfuric acid is added to neutralize the pH value until the pH value of the sodium silicate solution is decreased to approximately 6 to obtain silica gel solution.

(3) 5 g calcium chloride is added to the silica gel solution, stirred and stood, the resistance is measured at the time.

(4) After the solution is stratified, the upper water is filtered out and water is added again, stirred and stood, the resistance is measured at the time and the step is repeated until the resistance reaches a M ohm level.

(5) 100 g polyethylene glycol with Mn of 8000 is added to the silica gel solution, stirred such that polyethylene glycol is completely dissolved to obtain a mixed solution.

(6) The water in the mixed solution is evaporated by heating, drying, or naturally drying etc., to obtain a mixture of the polyethylene glycol and the silica.

(7) The mixture is crushed by crushing machine or other crushing methods, and the composite flame retardant of graphite and ammonium polyphosphate is added to obtain the composite phase change material after being stirred uniformly, wherein the ratio of the graphite and the ammonium polyphosphate is 1:2.

The above composite flame retardant can be also a mixture of graphite and polypropylene, or a mixture of graphite, polypropylene, and ammonium polyphosphate. When the composite flame retardant presents 5-25% therein, especially closing to 20%, the flame retardancy of the resulting composite phase change material is better and it can be subjected to HB order of the flame retardancy test above alcohol lamp. In one example, the weight ratio of the graphite and the polymer is 1:2, and the resulting composite phase change material can be subjected to V-2 order of the flame retardancy test.

In the above preparation method, besides that calcium chloride is used as a promoter, magnesium chloride, aluminum chloride, and/or a combination thereof can be also added to accelerate the gel reaction speed. When the content of the promoter presents 1-10% of the whole composite phase change material, especially 1-5%, the effect is more significant.

A composite phase change material having a different phase transition enthalpy can be obtained by varying the ratio of polyethylene glycol, silica gel solution, and composite flame retardant, to vary the properties of flame retardancy, resistance, and/or anti-sagging. For instance, when the content of polyethylene glycol is 50-90%, the content of sodium silicate is 5-30%, and the content of promoter is 1-10% of the composite phase change material, the resulting composite phase change material has the best properties, and during phase change it has a stable morphology, a higher resistance, and a good flame retardancy, which is, in one example, suitable for cooling of a lithium battery unit. The measured content of silica vehicle presented in the composite phase change material at the time is about between 2 and 10%, the ratio of the polyethylene glycol and the silica is about 9:1.

In one example, in order to increase the thermal conductivity of the composite phase change material, a high thermal conductivity material composed of at least one of carbon fibers, metal foam, nano-aluminum nitride, nanoscale metal particles, nanoscale metal oxide particles, or metal shavings can be added during the preparation process.

Although certain example methods and compositions have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A composite phase change material, comprising:
   polyethylene glycol;
   silica vehicle; and
   a composite flame retardant with graphite and polymer, wherein the weight ratio of the graphite and the polymer in the composite flame retardant is approximately 1:2.

2. The composite phase change material claimed in claim 1, wherein the silica vehicle is a plurality of nanoscale silica particles.

3. The composite phase change material claimed in claim 1, wherein the polymer is at least one of polypropylene or ammonium polyphosphate.

4. The composite phase change material claimed in claim 1, wherein the silica vehicle is approximately 2 to 10% of the composite phase change material.

5. The composite phase change material claimed in claim 1, wherein the composite flame retardant is approximately 20% of the composite phase change material.

6. The composite phase change material claimed in claim 1, wherein the weight ratio of the polyethylene glycol and the silica is approximately 9:1.

7. The composite phase change material claimed in claim 1, wherein the graphite is expanded graphite.

8. The composite phase change material claimed in claim 1, wherein the composite phase change material is operable to be used for cooling a battery.

9. The composite phase change material claimed in claim 8, wherein the battery is a lithium-ion battery provided with at least one single lithium-ion battery cell with a diameter of approximately 18 mm and a length of approximately 65 mm.

10. The composite phase change material claimed in claim 8, wherein the battery is removably connectable to a power tool.

11. A method of preparing a composite phase change material, comprising steps of:
    (1) dissolving polyethylene glycol in water and adding suitable amount of a silica gel solution formed by reacting silica vehicle and hydrogel;
    (2) mixing the polyethylene glycol and the silica gel solution sufficiently by stirring;
    (3) evaporating water from the mixed solution to obtain a mixture of the polyethylene glycol and the silica vehicle;
    (4) crushing the evaporated mixture;
    (5) adding composite flame retardant composed of graphite and polymer in a weight ratio of approximately 1:2; and
    (6) stirring uniformly to obtain the composite phase change material.

12. The method of preparing the composite phase change material claimed in claim 11, wherein the polymer is at least one of polypropylene or ammonium polyphosphate.

13. The method of preparing the composite phase change material claimed in claim 11, wherein the silica vehicle is a plurality of nanoscale silica particles.

14. The method of preparing the composite phase change material claimed in claim 13, wherein the silica particles have a diameter of approximately 8 to 15 nm.

15. The method of preparing the composite phase change material claimed in claim 11, wherein in the step (2), when mixing the polyethylene glycol and the silica gel solution, a promoter composed of at least one of calcium chloride, magnesium chloride, or aluminum chloride is added.

16. The method of preparing the composite phase change material claimed in claim 11, wherein the silica vehicle presents from 2 to 10% of the composite phase change material.

17. The method of preparing the composite phase change material claimed in claim 11, wherein the composite flame retardant presents from 5 to 25% of the composite phase change material.

18. The method of preparing the composite phase change material claimed in claim 11, wherein the weight ratio of the polyethylene glycol and the silica in the composite phase change material is approximately 9:1.

19. The method of preparing the composite phase change material claimed in claim 11, wherein the composite phase change material is operable for use in cooling a battery.

20. The method of preparing the composite change material claimed in claim 19, wherein the battery is a lithium-ion battery.

21. The method of preparing the composite change material claimed in claim 20, wherein the lithium-ion battery is provided with at least one single lithium-ion battery cell with a diameter of approximately 18 mm and a length of approximately 65 mm.

22. The method of preparing the composite phase change material claimed in claim 11, wherein the lithium-ion battery is removably connectable to a power tool.

* * * * *